Dec. 26, 1939.          C. J. CONN               2,184,954
           METHOD FOR QUICK FREEZING OF FOOD PRODUCTS
                      Filed May 26, 1937

INVENTOR.
Chester J. Conn
BY
his         
           ATTORNEY.

Patented Dec. 26, 1939

2,184,954

UNITED STATES PATENT OFFICE 2,184,954

METHOD FOR QUICK FREEZING OF FOOD PRODUCTS

Chester J. Conn, Suffolk County, N. Y.

Application May 26, 1937, Serial No. 144,785

3 Claims. (Cl. 62—170)

This invention relates to improvements in methods and apparatus for quick freezing of food products, being particularly directed to the application of a refrigerant substantially in the nature of a film or sheet to the surface of the products being frozen.

Up to the present time, in the art of freezing, methods have been applied wherein the product being treated (a) is immersed in a refrigerating liquid; (b) is disposed in a sharp freezer incorporating air at low temperatures and (c) is subjected to sprays incorporating particles of liquid refrigerant.

The immersion process provides the proper medium for heat exchange through conduction between refrigerant and product, but has very low displacement velocity of refrigerant with respect to product, resulting in a relatively low heat exchange efficiency; the sharp freezing process involving air provides rapid velocity of refrigerant with respect to product, but has low heat conductivity, air being a relatively poor conductor, with the result that considerable loss of efficiency is entailed in preparing and maintaining the air refrigerant at the necessary low temperatures for proper heat exchange. The spray method provides some of the advantages of the conductivity of the liquid refrigerant and the advantage of rapid movement of the refrigerating particles; however, the presence of air in the chamber and between the particles introduces a poor conductor and particularly the air adjacent the surface of the product being frozen introduces a low conductive film, cutting down the heat exchange efficiency of the liquid particles.

Broadly, it is an object of this invention to provide a method and apparatus for quick freezing food products by applying in surface contact with the food products being treated a refrigerant in the nature of a film or sheet formation.

Generally, it is an object of this invention to provide a method and apparatus for quick freezing food products, whereby a refrigerant in the nature of a continuous film or sheet of liquid is applied in tangential surface contact with the food products, thereby to provide for a rapid heat withdrawal therefrom.

Specifically, it is an object of this invention to provide a method and apparatus for quick freezing food products, whereby refrigerant in the nature of a continuous film or sheet of planar fan-like formation, is directed to provide a progressive surface contact with the product being frozen.

Still further, it is an object of this invention to provide a method and apparatus for quick freezing food products, whereby liquid refrigerant is discharged through an elongated aperture under substantially normal water-main pressure and deflected so as to provide a continuous radial planar fan-like film or sheet in progressive tangential contact with the surfaces of the products being treated for heat exchange.

These and other advantages, capabilities and features of the invention will appear from the subjoined detailed description of one specific embodiment thereof illustrated in the accompanying claims, in which:

Figure 2:
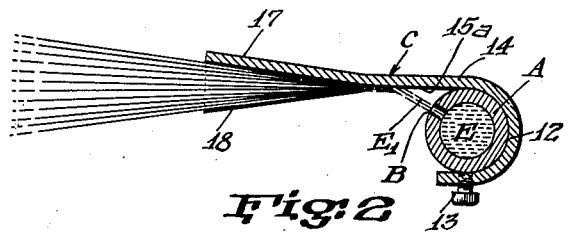
Figure 2 is an end elevation in section along lines 2—2 of Figure 1 showing in addition the distribution of the refrigerating medium.
Figure 1:
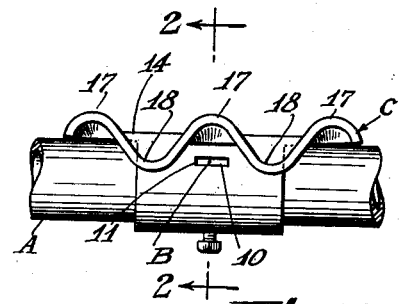
Figure 1 is a front view of a preferred embodiment of a device for carrying out my method.

Referring to the reference characters in the drawing, letter A represents a conduit, B a discharge aperture formed therein, C a deflector unit associated with said discharge aperture, D the product being frozen, and E the refrigerating fluid as applied.

In a preferred embodiment of my invention the refrigerating fluid, in this case a sodium or calcium brine, is passed through the conduit A for discharge through the angularly disposed apertures B, the said apertures being elongated in conformation, the length 10 being considerably greater than the width 11, so as to provide for the discharge of refrigerating liquid E in a flat and wide conformation involving a film or sheet E—1, as shown in Figure 2.

The deflector unit C, in the embodiment shown, comprises a J-shaped element, the circular leg 12 of which substantially encompasses the periphery of the conduit A adjacent the discharge aperture, there being provided a set screw 13 for locking the same to the conduit in the manner to dispose the elongated body portion thereof substantially horizontally and angularly with respect to the path of the refrigerant liquid passing through the discharge aperture B. The body portion of the deflector unit C has a substantially flat head portion 14 having its end extremity defined by arc 15 and a wing portion 16 formed integral with the head portion and disposed somewhat angularly thereto, said wing portion serving to extend radially from the arc 15 and having a formation of ridges 17 and valleys 18 of gradually increasing width and height towards the outer extremities of the deflector unit.

Figure 3:
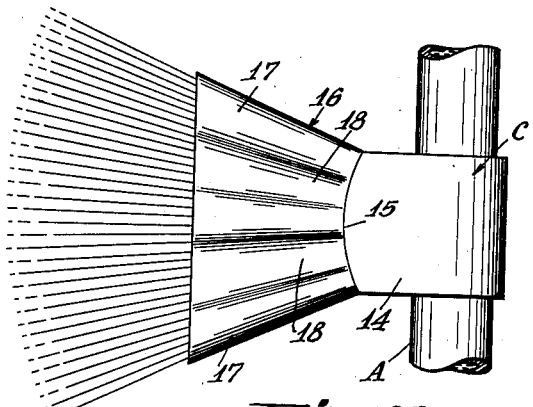
Figure 3 is a plan view of the disclosure in Figure 2.

The refrigerant liquid E passing through the aperture B is discharged in a flat relatively thick film or sheet E—1, and contacts the undersurface 15a of the head portion of the deflector unit at a point inwardly of the arc 15, whereupon the same is laterally and angularly directed along the ridge and valley formations 17 and 18 of the wing 16 to provide for the radial deflection with respect to its planar surface as shown in Figure 2, and laterally deflected along its planar surface, as shown in Figure 3, the said film or sheet E—1, being in this manner applied thereto for directive displacement as required for contact with the surfaces of the products being frozen.

Figure 4:
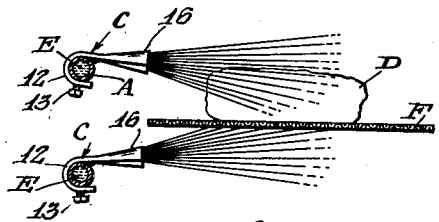
Figure 4 is an end elevation partially in section showing the application of a preferred embodiment involving my method in carrying out the invention.

As shown in Figure 4 the product D is progressively displaced through a refrigerating tunnel on a perforated conveyor belt F and the refrigerant discharge mechanisms are disposed laterally above and below the same, so that the refrigerant, upon discharge through the aperture B and displacement through deflector unit C is in the form of a continuous film or sheet of the conformation shown in Figures 2 and 3, with the planar surfaces thereof coming into substantially tangential contact with the exposed surfaces of the product.

Figure 5:
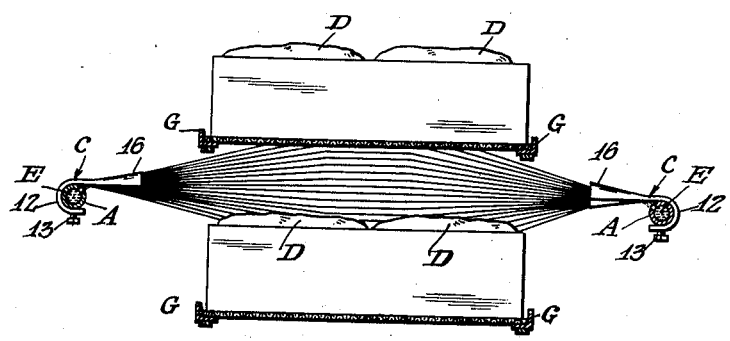
Figure 5 is an end view partially in section of another application of my method in carrying out the invention.

As shown in Figure 5, wherein another application of my method is disclosed, a series of products D carried in this instance in frames G open at both ends and resting on a perforated screen are disposed in tiers in a freezing cabinet, with a series of discharge mechanisms disposed laterally of and between the same, so that the progressive films or sheets of the refrigerant upon deflection may provide for tangential surface contact with the products being treated.

In either of the methods shown in Figures 4 and 5 the refrigerating fluid in the form of a continuous film or sheet is directed and deflected so that substantially all of the exposed surface of the product is contacted by such film or sheet, the method of support or movement of the food products in a tunnel or cabinet and the location and relation of the fluid discharge control mechanism being illustrative of some of the means for carrying out the invention.

It is pointed out that although the film or sheet will upon attainment of a considerable distance away from the discharge aperture and deflecting mechanism begin to feather due to gravity, that is fluid particles fall away from the film or sheet formation, it is the purpose of this invention to so control pressure of the refrigerating fluid E, size of apertures B and deflector units C, that the continuous films or sheets as definite formations contact the surfaces of the food being treated in the manner specified prior to the feathering thereof.

It is pointed out that the heat exchange in my invention is directed not to the use of refrigerating liquid as such but to the use of relatively thin, flat and spreading progressive or continuous film or sheet of refrigerating liquid, adapted through rapid substantially tangential surface contact with the products being frozen to bring about an efficient and quick heat withdrawal.

Although in the drawing the discharge aperture is shown as a rectangular formation and the deflector as a fan-shaped member having radial corrugations, it is within the province of this invention to vary the contour and dimensions of the aforesaid elements, so long as the refrigerating liquid discharged therethrough and deflected thereby will be distributed and applied to the product being treated in the nature of a continuous film or sheet.

It is further pointed out that although air will be present in the freezing chamber, the wiping action of the continuous film or sheet of refrigerant contacting the surface of the food product will eliminate the formation of any air film or layer of low conductivity.

It is obvious that various changes and modifications may be made to the details of construction without departing from the general spirit of the invention as set forth in the appended claims.

I claim:

1. A method of refrigerating products, comprising discharging refrigerant of substantially film or sheet form, and subjecting the discharged refrigerant to a deflection horizontally and vertically, into tangential contact with the surfaces of the products.

2. A method of refrigerating products, comprising discharging liquid refrigerant substantially in the form of a film or sheet, acting on the film or sheet to deflect the same laterally and vertically for increasing the spread thereof, and delivering the same as deflected and spread into tangential contact with the surfaces of the products.

3. A method of refrigerating products comprising discharging refrigerant in the form of a continuous film or sheet, and acting on such film or sheet to cause the same to contact tangentially with the surfaces of the products being treated.

CHESTER J. CONN.